United States Patent
Heeder et al.

(10) Patent No.: US 10,532,725 B2
(45) Date of Patent: Jan. 14, 2020

(54) POSITION SENSING SYSTEM FOR A BRAKING SYSTEM

(71) Applicant: Sensata Technologies, Inc., Attleboro, MA (US)

(72) Inventors: Nicholas Heeder, Saunderstown, RI (US); Edward O'Brien, Rehoboth, MA (US); Aditya Balasubramanian, Pawtucket, RI (US); Nevin Molyneaux, Crumlin (IE); Mark Duffy, Antrim (IE)

(73) Assignee: Sensata Technologies, Inc., Attleboro, MA (US)

( * ) Notice: Subject to any disclaimer, the term of this patent is extended or adjusted under 35 U.S.C. 154(b) by 131 days.

(21) Appl. No.: 15/647,785

(22) Filed: Jul. 12, 2017

(65) Prior Publication Data

US 2019/0016327 A1   Jan. 17, 2019

(51) Int. Cl.
*F16D 66/02* (2006.01)
*B60T 17/22* (2006.01)
*F16D 66/00* (2006.01)
*B60T 17/00* (2006.01)

(52) U.S. Cl.
CPC ............ *B60T 17/221* (2013.01); *F16D 66/00* (2013.01); *F16D 66/021* (2013.01); *F16D 66/023* (2013.01); *B60T 17/00* (2013.01)

(58) Field of Classification Search
CPC ...... F16D 66/023; F16D 66/021; F16D 66/00; B60T 17/221; B60T 17/00
See application file for complete search history.

(56) References Cited

U.S. PATENT DOCUMENTS

| | | | | |
|---|---|---|---|---|
| 4,685,540 A | * | 8/1987 | Rath | F16D 66/02 188/1.11 L |
| 4,850,454 A | * | 7/1989 | Korody | F16D 66/023 188/1.11 L |
| 6,042,079 A | * | 3/2000 | Hogenkamp | B23Q 15/22 188/378 |
| 6,257,374 B1 | * | 7/2001 | Strzelczyk | B60T 17/221 188/1.11 E |
| 6,276,494 B1 | * | 8/2001 | Ward | F16D 65/183 188/1.11 L |
| 6,481,539 B1 | * | 11/2002 | Shaw | F16D 55/22655 188/1.11 E |
| 8,310,356 B2 | * | 11/2012 | Evans | F16D 66/022 188/1.11 R |
| 2004/0263324 A1 | * | 12/2004 | Sanchez | B60C 23/0408 340/442 |

(Continued)

*Primary Examiner* — Melody M Burch
(74) *Attorney, Agent, or Firm* — Burns & Levinson, LLP; Joseph M. Maraia; Daniel J. McGrath

(57) ABSTRACT

A position sensing system for a braking system has a rotor and a caliper assembly disposed at least partially around the rotor. The caliper assembly has a fixed mount bracket and a floating portion. At least two brake pads are attached to the floating portion, operable to exert a force against the rotor in response to a force through the floating portion. A first portion is coupled to the fixed mount bracket. A second portion is coupled to the floating portion such that the second portion moves in response to movement of the floating portion. A sensor assembly measures a distance between the first portion and the second portion. A wireless transmitter sends a signal from the sensor assembly to detached electronics, the signal representing the distance measured.

13 Claims, 13 Drawing Sheets

(56) References Cited

U.S. PATENT DOCUMENTS

| | | | | |
|---|---|---|---|---|
| 2006/0090968 A1* | 5/2006 | Taylor | ............... | F16D 55/2255 |
| | | | | 188/1.11 L |
| 2006/0149440 A1* | 7/2006 | Pettersson | ............. | B60T 17/221 |
| | | | | 701/34.4 |
| 2011/0168619 A1* | 7/2011 | Kuhnrich | ............... | B01D 29/15 |
| | | | | 210/232 |
| 2011/0240410 A1* | 10/2011 | Barrio | ..................... | B66D 5/30 |
| | | | | 187/288 |

* cited by examiner

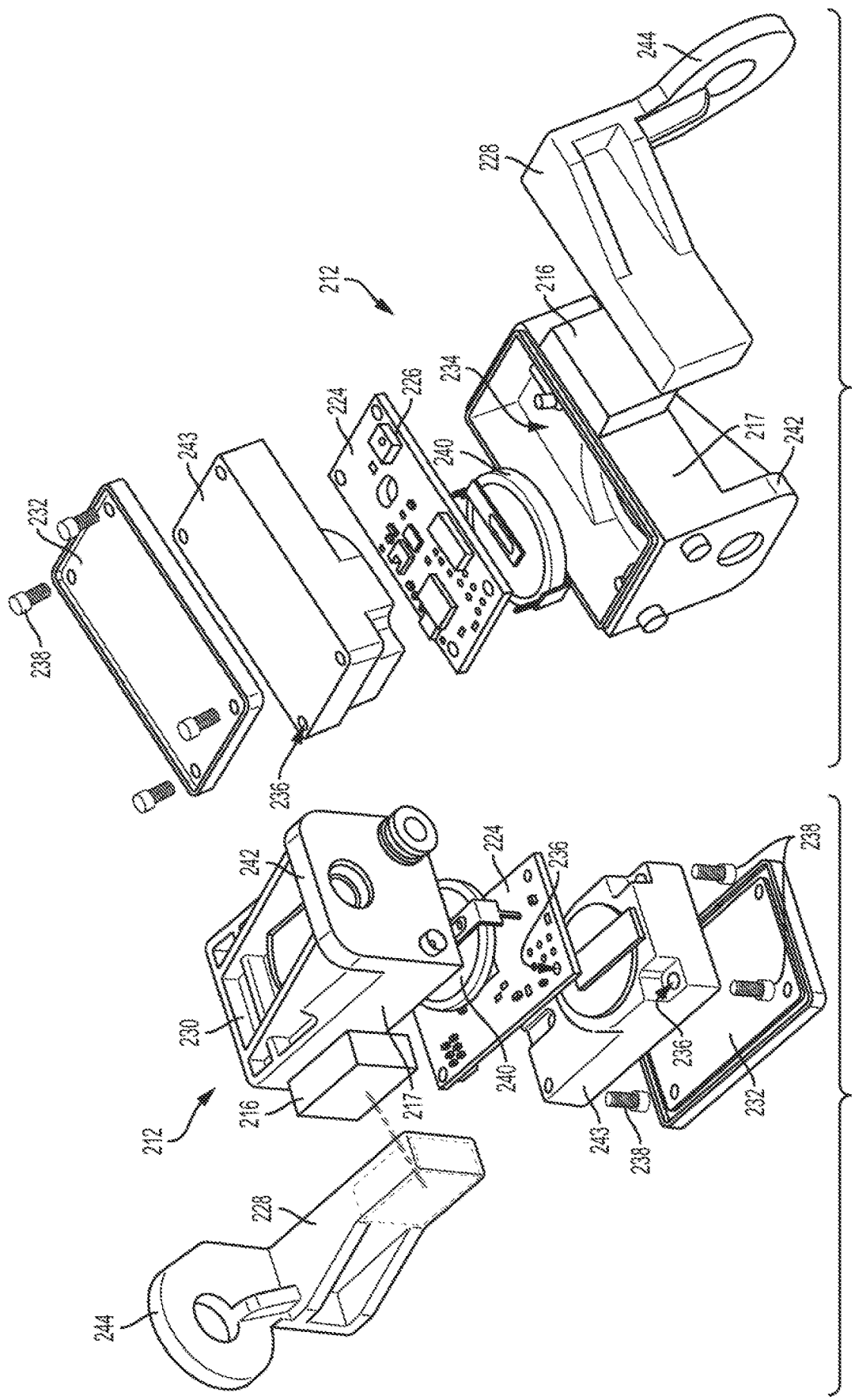

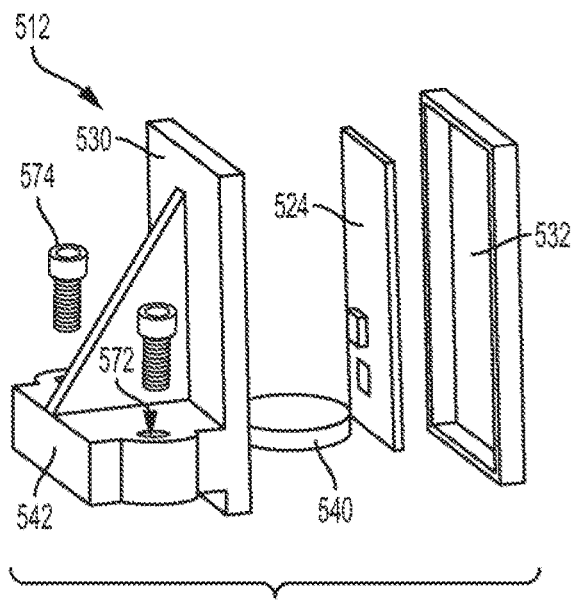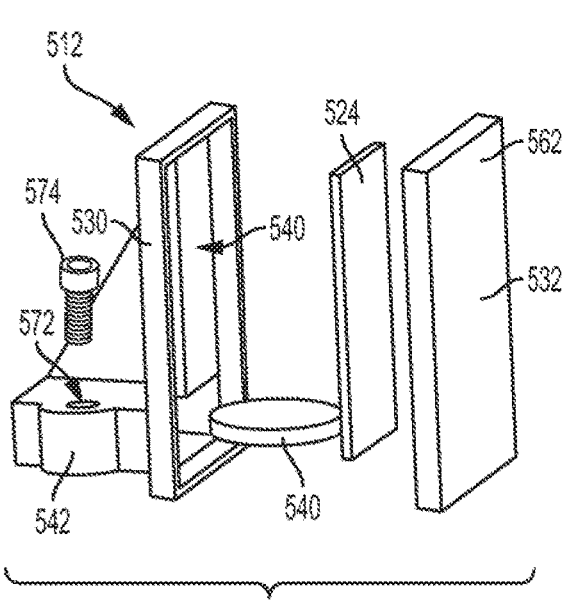
FIG. 10A  FIG. 10B
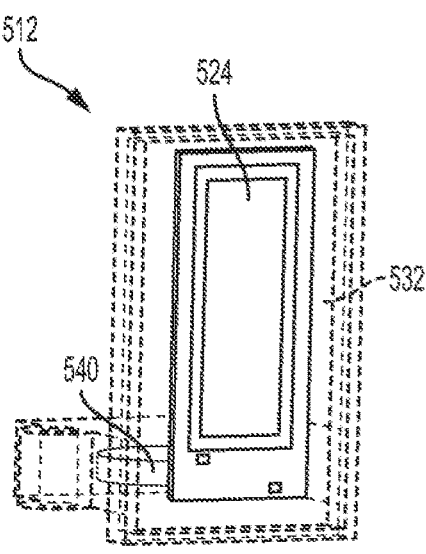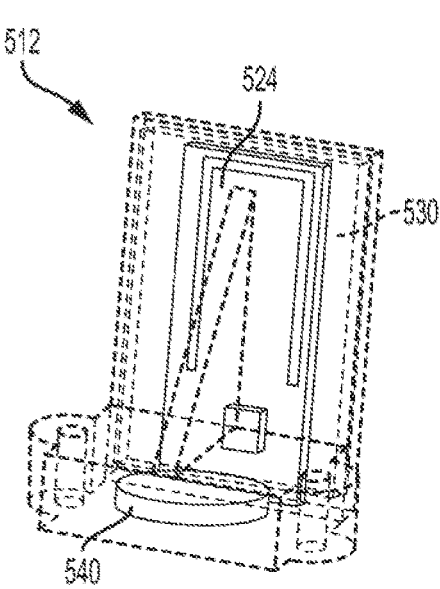
FIG. 10C  FIG. 10D

POSITION SENSING SYSTEM FOR A BRAKING SYSTEM

FIELD OF THE INVENTION

The subject disclosure relates to sensing technology and more particularly to systems for sensing the wear of brake pads within a braking system.

BACKGROUND OF THE INVENTION

Without a sensor for determining the wear of a brake pad, drivers are forced to remove one or more tires from their vehicle to determine the level of wear on their brake pads. The typical current market application for brake pad wear sensing consists of a device that indicates when the pad has sufficient wear to warrant replacement. The "sensor" typically consists of a wire that is broken when the pad wear reaches the point of the sensor causing the wire to be consumed during the braking process and leading to an open circuit. The open circuit is then used to indicate a light on the vehicle dashboard indicating that the brake pads need replacing. The sensor is consumed during the operational life of the brake pads and must be replaced when the brake pads are replaced at additional owner cost. Further, the wire harness for the brake pad wear sensor described above must be included in the vehicle architecture. This includes the complicated routing of a wire in the moving wheel suspension system as well as consuming connection points on vehicle system modules for the data acquisition.

SUMMARY OF THE INVENTION

There is a market desire to have a system that regularly provides output regarding current brake pad wear. Further, there is a need for a system that is designed for the life of the vehicle rather than the life of the brake pads. There is yet a further desire for a system that can be connected to a central computer system where detailed information about the health of the vehicle is displayed for the driver and/or vehicle manufacturer so that, for example, the information can be used to time incentives sent to the owner for dealership service. For example, in autonomous and fleet shared vehicles, such a display could be of particular importance since the drivers might tend to be less concerned with the health of the vehicle.

In light of the needs described above, in at least one aspect, there is a need for a sensing system for a braking system which allows a user to identify the wear of a brake pad without removing the wheel of a vehicle. Further, in at least one aspect, the subject technology provides a sensing system for a braking system which is capable of regularly measuring brake pad wear and wirelessly transmitting those measurements. Further, in at least one aspect, the subject technology provides a sensing system for a braking system that can be easily integrated with existing braking systems and is not required to be removed when the user changes their brakes.

In one embodiment, the subject disclosure relates to a position sensing system for a braking system with a rotor and a caliper assembly disposed at least partially around the rotor, the caliper assembly having a fixed mount bracket and a floating portion. At least two brake pads are attached to the floating portion and are operable to exert a force against the rotor in response to a force through the floating portion. A first portion is coupled to the fixed mount bracket. A second portion is coupled to the floating portion such that the second portion moves in response to movement of the floating portion. A sensor assembly measures a distance between the first portion and the second portion. A wireless transmitter for sending a signal from the sensor assembly to detached electronics, the signal representing the distance measured. In one embodiment, the detached electronics include a microprocessor configured to receive the signal and calculate a value of brake pad wear based on the distance measured. The position sensing system can also include a display for showing the value of brake pad wear.

In some embodiments, the sensor assembly can be attached to the first portion and a magnet can be attached to the second portion. The sensor assembly can then measures the distance between the first portion and the second portion by sensing the distance between the magnet and the sensor assembly. In some embodiments, the magnet is attached to the first portion and the sensor assembly is attached to the second portion.

In some embodiments, the sensor assembly is the first portion, the sensor assembly being to the fixed mount bracket. The second portion can be a metallic reference portion coupled to the floating portion. The sensor assembly can then include an inductive sense element for measuring a distance between the inductive sense element and the metallic reference portion.

In some embodiments, the sensor assembly can include an electronics module assembly having a sense element, a printed circuit board, an antenna, a battery, and the wireless signal transmitter. The sensor assembly can also include a housing and a cover, the cover attaching to the housing to form a chamber containing the electronics module assembly. In some embodiments, the housing forms a channel around an axis, the magnet positioned to move along the axis in response to movement of the floating portion. The magnet and channel can be corresponding shapes, such as cylindrical.

In at least one embodiment, the subject technology relates to a wireless linear position sensing system for a braking system. The braking system includes a rotor and a caliper assembly disposed at least partially around the rotor. The caliper has a fixed mount bracket and a floating portion. At least two brake pads attach to the floating portion, the brake pads operable to exert a force against the rotor in response to a force through the floating portion. The wireless linear position system includes a magnet attached to first portion of the caliper assembly and a sensor assembly attached to a second portion of the caliper assembly. The sensor is configured to measure a distance between the magnet and the sensor. The wireless linear position sensor also includes a wireless transmitter for sending a signal from the sensor assembly to detached electronics, the signal representing the distance measured.

In some cases, the first portion of the caliper assembly can be located on the floating portion and the second portion of the caliper assembly can be located on the fixed mount bracket. In other cases, the first portion of the caliper assembly is located on the fixed mount bracket and the second portion of the caliper assembly is located on the floating portion. The sensor assembly can include an electronics module assembly having a sense element, a printed circuit board, an antenna, a battery, and the wireless signal transmitter.

In some embodiments, the subject technology relates to a wireless linear position sensing system for a braking system. The braking system includes a rotor and a caliper assembly disposed at least partially around the rotor having a fixed mount bracket and a floating portion. The floating portion has at least two ends disposed around the rotor and a brake pad attached to each end operable to exert a force against the rotor in response to a force through the floating portion. The wireless linear position system also includes a metallic reference portion coupled to one of the ends such that movement of said end causes a corresponding movement in the metallic reference portion. An inductive sensing assembly is attached to the fixed mount bracket and configured to measure the distance between the metallic reference portion and the inductive sensing assembly. A wireless transmitter sends a signal from the sensor assembly to detached electronics, the signal representing the distance measured.

The inductive sensing assembly can include an electronics module assembly having an inductive sense element, a printed circuit board, an antenna, a battery, and the wireless transmitter. In some embodiments, the inductive sensing assembly can also include a housing and a cover, the cover attaching to the housing to form a chamber containing the electronics module assembly. The housing can include a flange with a threaded axial bore for receiving a screw to removably attach the housing to the fixed mount bracket. Further, in some embodiments the cover and electronics module assembly are arranged parallel to a plane and movement of the floating portion causes the metallic reference portion to move parallel to the plane.

BRIEF DESCRIPTION OF THE DRAWINGS

So that those having ordinary skill in the art to which the disclosed system pertains will more readily understand how to make and use the same, reference may be had to the following drawings.

FIG. 5A is an exploded view of the position sensing system of FIG. 3.

FIG. 5B is an exploded view of the position sensing system of FIG. 3.

FIG. 10A is an exploded view of the sensor assembly of FIGS. 8 and 9.

FIG. 10B is an exploded view of the sensor assembly of FIGS. 8 and 9.

FIG. 10C is a front view of the sensor assembly of FIGS. 8 and 9 with the housing and cover shown in broken line.

FIG. 10D is a rear view of the sensor assembly of FIGS. 8 and 9 with the housing and cover shown in broken line.

DETAILED DESCRIPTION

Figure 1:
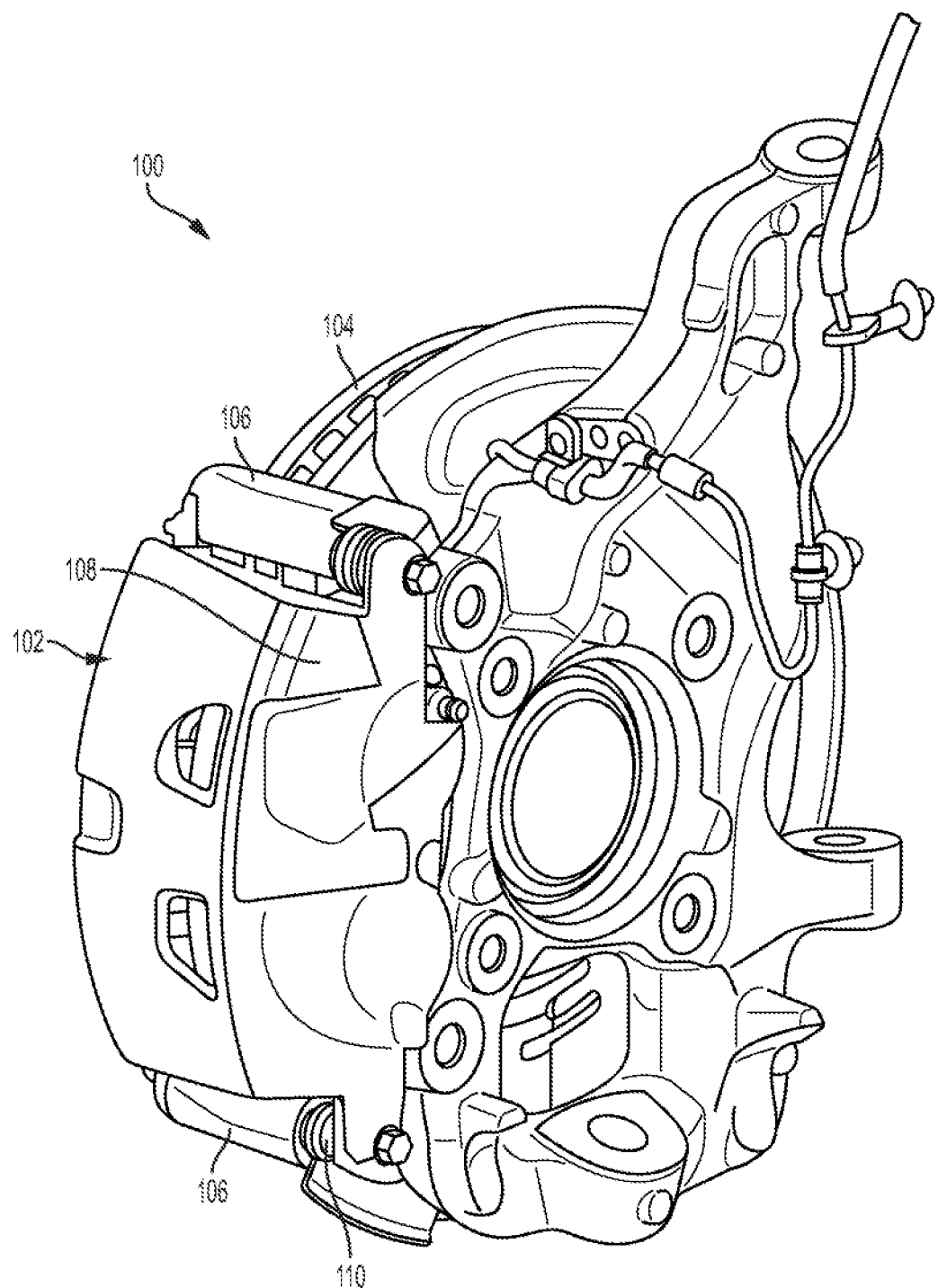
FIG. 1 is a perspective view of a typical braking system.

The subject technology overcomes many of the prior art problems associated with tracking brake pad wear. In brief summary, the subject technology provides a position sensing system, such as a wireless linear position sensing system, which tracks brake pad wear regularly over the life of the system. The advantages, and other features of the systems and methods disclosed herein, will become more readily apparent to those having ordinary skill in the art from the following detailed description of certain preferred embodiments taken in conjunction with the drawings which set forth representative embodiments of the present invention. Like reference numerals are used herein to denote like parts. Further, words denoting orientation such as "upper", "lower", "distal", and "proximate" are merely used to help describe the location of components with respect to one another. For example, an "upper" surface of a part is merely meant to describe a surface that is separate from the "lower" surface of that same part. No words denoting orientation are used to describe an absolute orientation (i.e. where an "upper" part must always be on top).

Referring now to FIG. 1, a typical braking system for a vehicle is shown generally at 100. The system 100 includes a caliper assembly 102 disposed partially around a rotor 104. The caliper assembly 102 includes a fixed mount bracket 106 and a floating portion 108. The fixed mount bracket 106 is statically attached to other components of the braking system 100. On the other hand, the floating portion 108 is coupled to the fixed mount bracket 106 by caliper slide pins 110 to allow movement towards and away from the rotor 104. The interior of the floating portion 108 usually contains at least two brake pads (not distinctly shown) surrounding the rotor 104. Holding the brake pads within the floating portion 108 can be accomplished by fixing the brake pads to two ends within the floating portion 108 which have fasteners for holding the brake pads in place. In any case, when a force is applied to the floating portion 108, for example by hydraulic fluid provided in response to the compression of a brake pedal within the vehicle, the floating portion 108 clinches the brake pads against the rotor 104. In turn, the brake pads apply a force to the rotor 104 to slow down and/or stop the vehicle.

Figure 2:
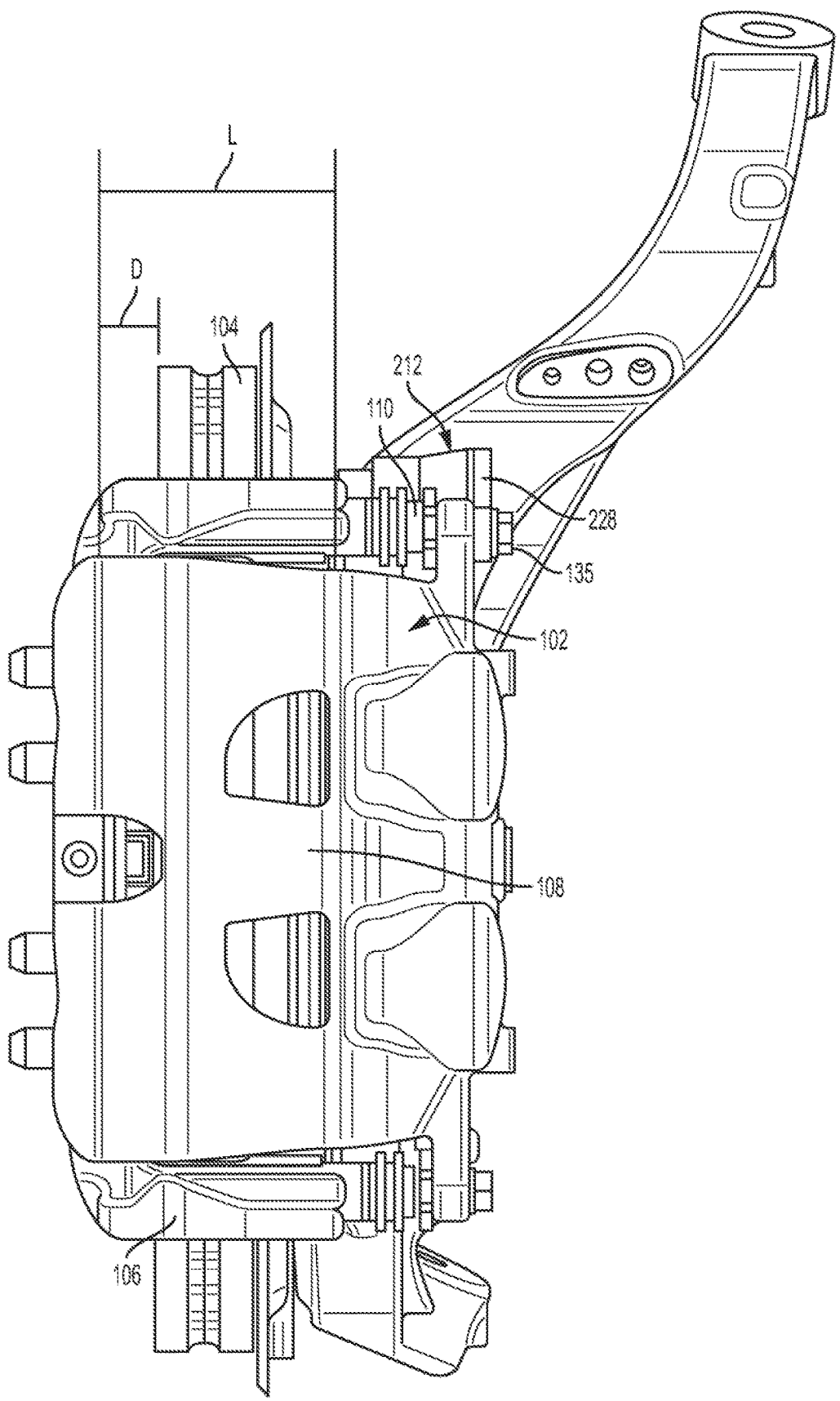
FIG. 2 is a top view of a braking system having a position sensing system in accordance with the subject technology.
Figure 3:
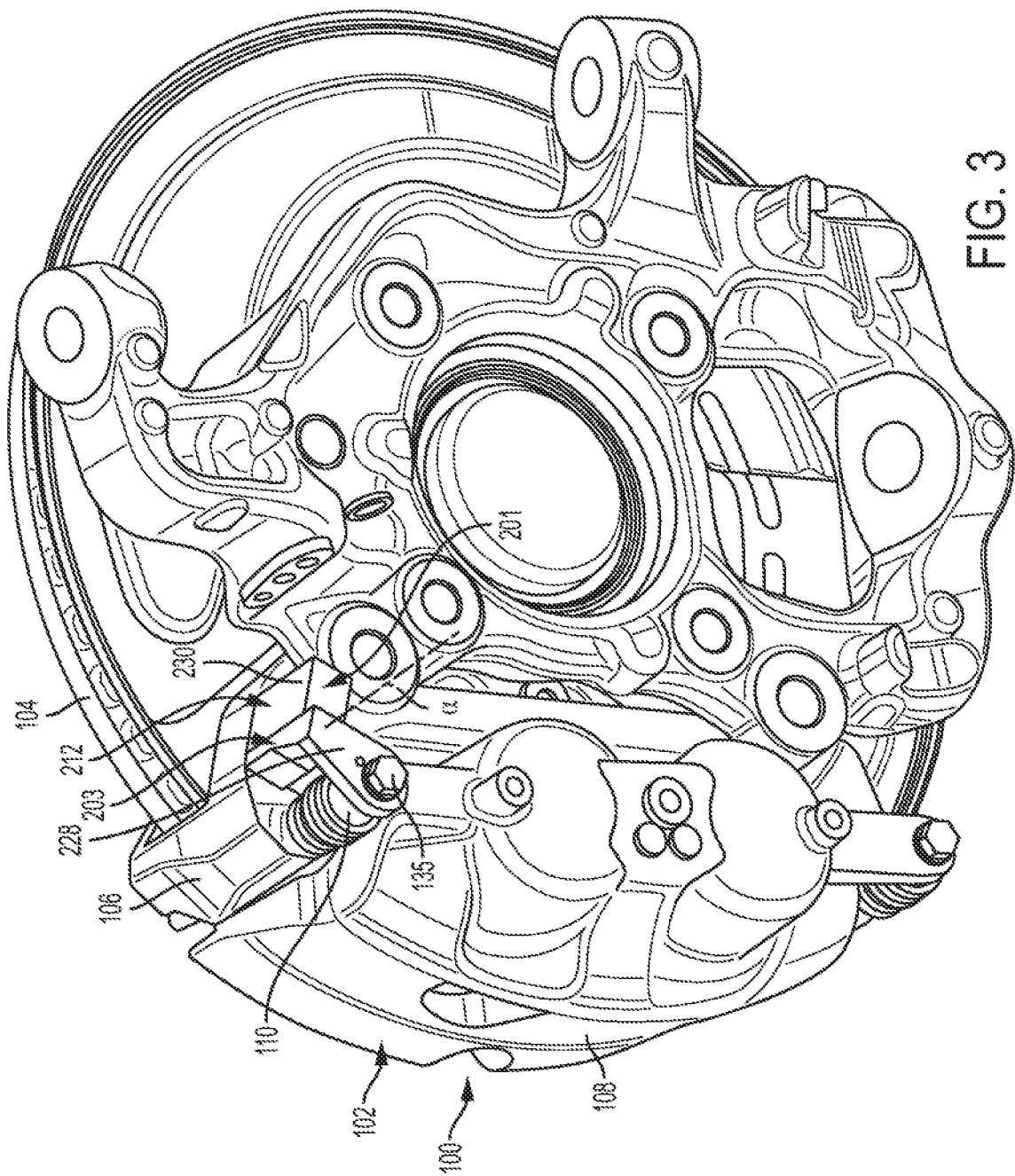
FIG. 3 is a perspective view of a braking system including an embodiment of a position sensing system in accordance with the subject technology.
Figure 4:
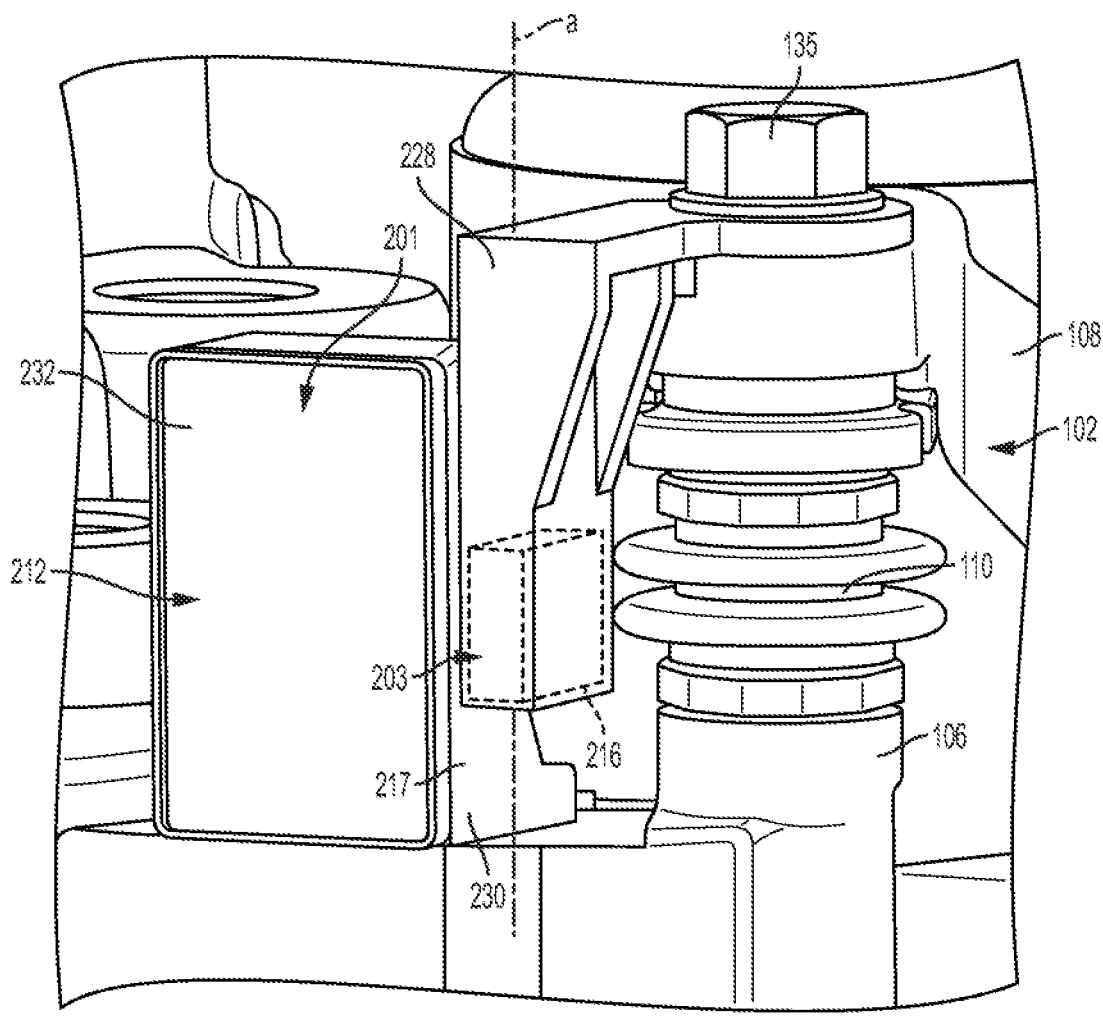
FIG. 4 is a zoomed in perspective view of the system of FIG. 3.
Figure 6A:
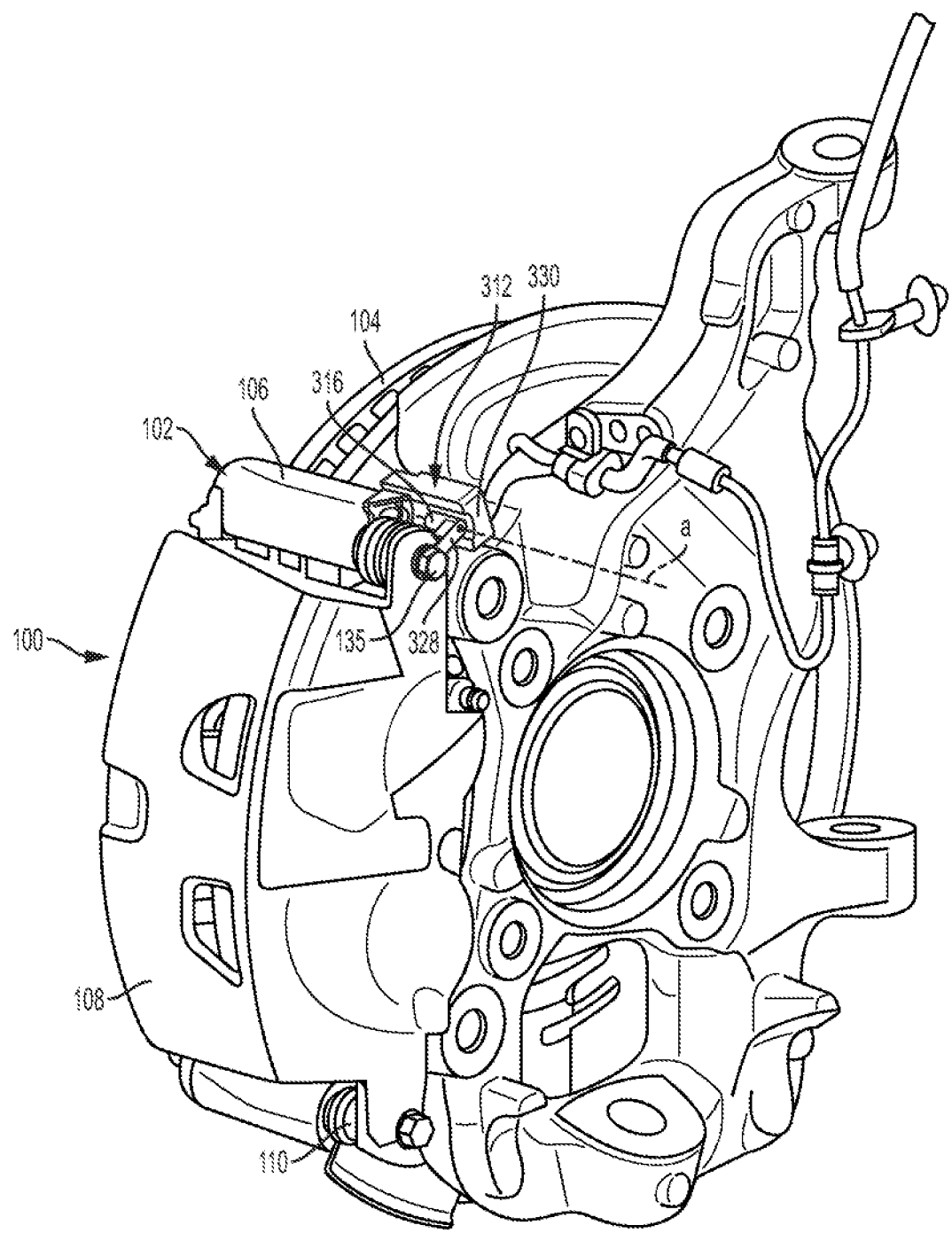
FIG. 6A is a perspective view of an alternative braking system including an embodiment of a position sensing system in accordance with the subject technology.
Figure 6B:
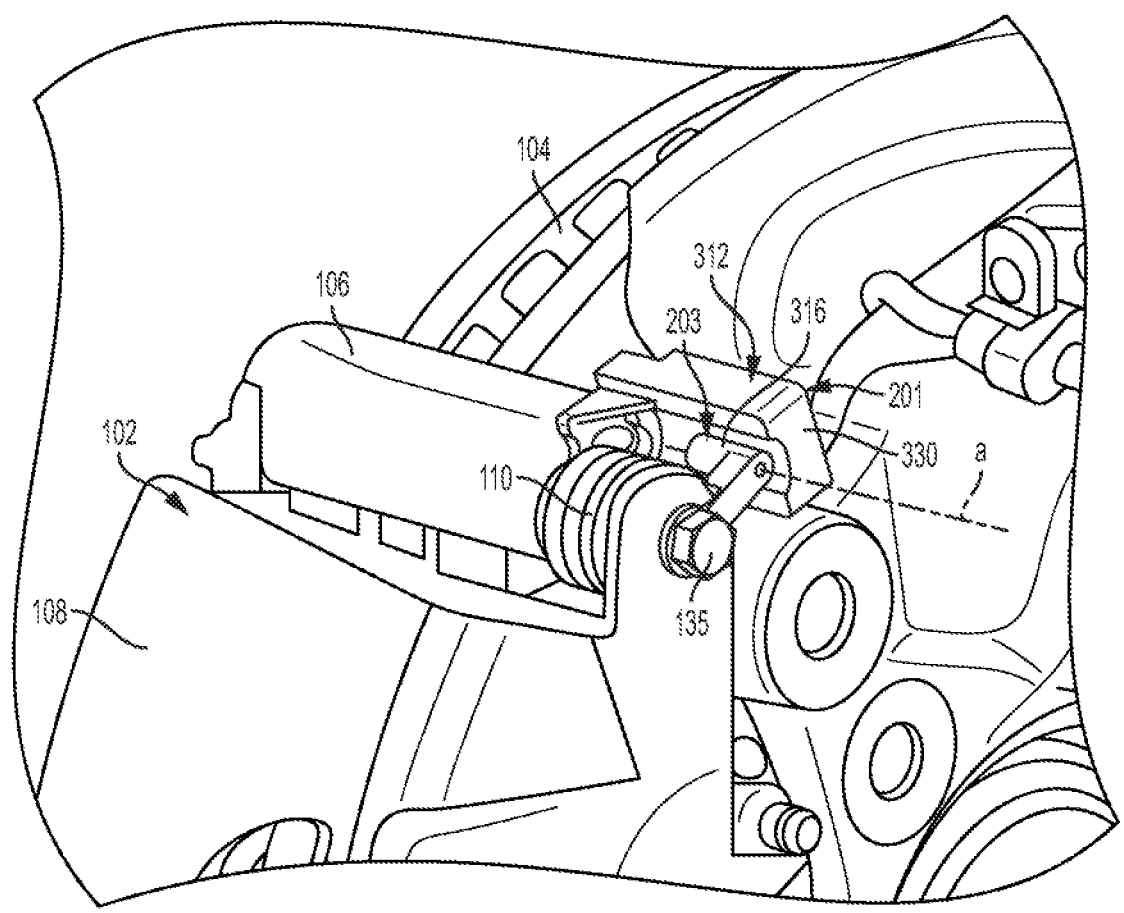
FIG. 6B is a zoomed in perspective view of system of FIG. 6A.
Figure 6C:
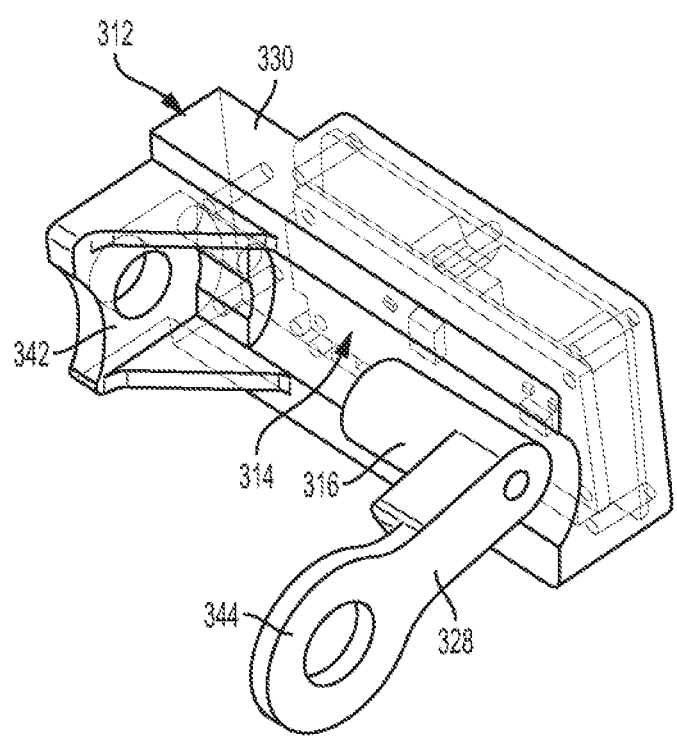
FIG. 6C is a perspective view of the sensor assembly of FIG. 6A.
Figure 6D:
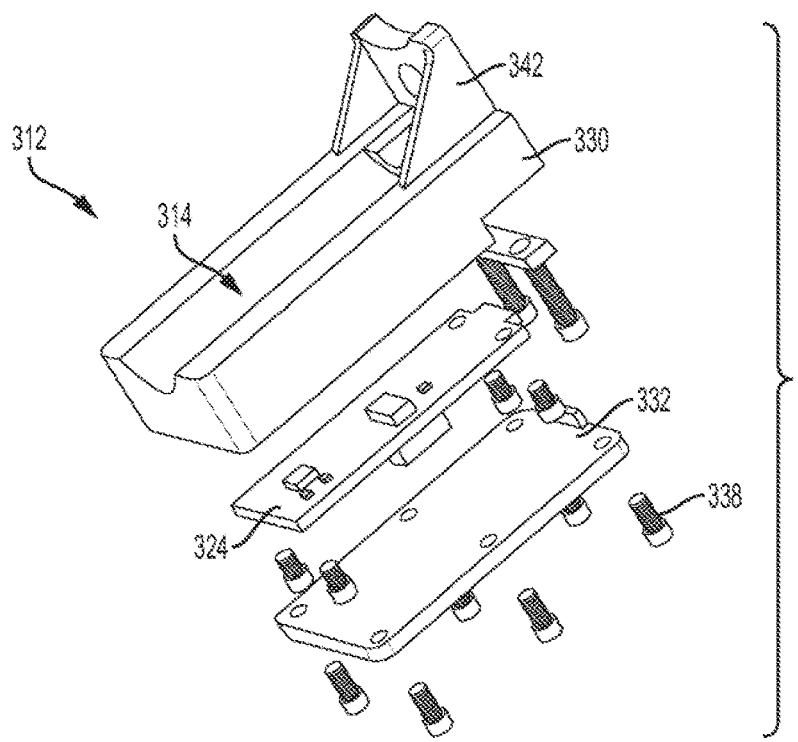
FIG. 6D is an exploded view of the sensor assembly of FIG. 6A.
Figure 6E:
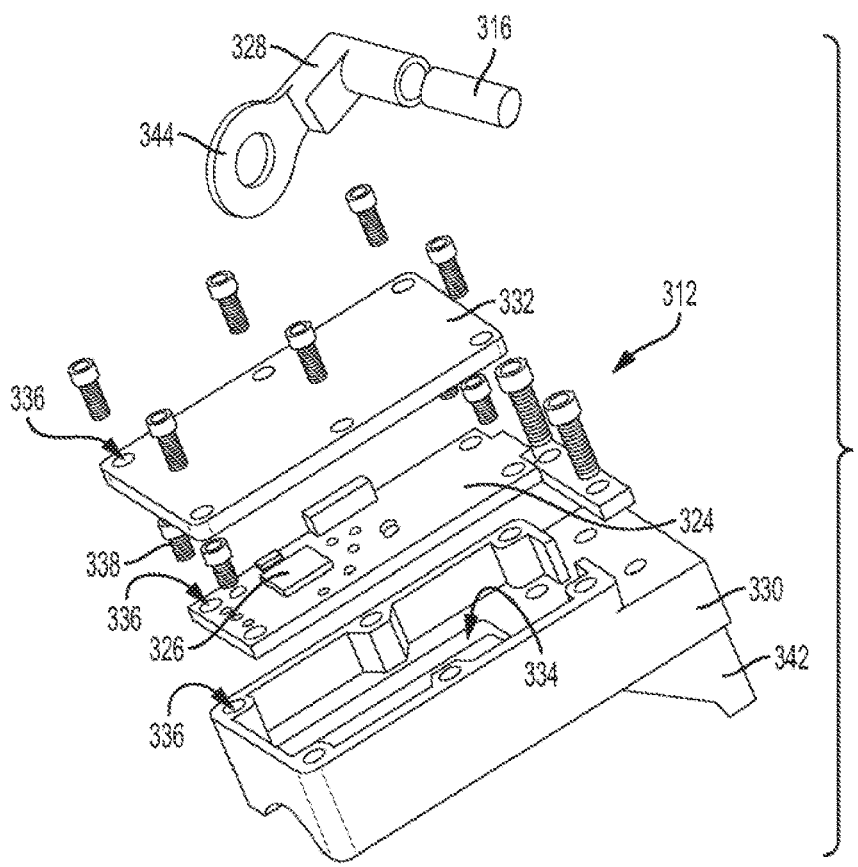
FIG. 6E is an exploded view of the sensor assembly of FIG. 6A.

Referring now to FIGS. 2-4, the braking system 100 includes a sensor assembly 212 that senses positional data. The sensor assembly 212 preferably uses a magnet 216 so that the operation is contactless, as described more fully herein.

The positional data relates to distance between a first portion 201 and a second portion 203 of the caliper assembly 102 to determine brake pad wear. The first portion 201 is mounted to the fixed mount bracket 106 via a rigid exterior housing 230. The housing 230 is attached to a cover 232 around an electronics module assembly 224. The electronics module assembly 224 includes at least one sense element 226 (FIG. 5B). Generally, the sense element 226 generates a signal that indicates a distance between the sense element 226 and the magnet 216, which is fixed on the second portion 203. The signal strength varies proportionally to the distance so that changes in signal strength can be calibrated to represent changes in the distance. The sense element 226 may be a Hall effect type sensor, a semiconductor based magnetic field sensor, and other types now known or later developed. In other embodiments, the sensor assembly 212 may utilize other contactless technology to determine the distance such as optical devices, capacitive sensors, inductive sensors, sonar, radar and the like.

The sense element 226 is a fixed magnetic position sense element, which senses the position of the magnet 216, which moves. Here, the magnet 216 is part of the second portion 203 of the sensor assembly 212. The magnet 216 is coupled to the floating portions 108 via a carrier 228. The magnet carrier 228 is coupled to one of the caliper slide pins 110. When the brake pads are not in use, the floating portion 108 sits in a first fixed position where there is a distance "L" between the inner most portion of the brakes pads and a distance "D" between the inner most portion of each brake pad and the rotor 104 (see FIG. 2). Notably, when the brake pads are in use, the brake pads are forced against the rotor 104 and therefore are displaced a distance roughly equal to "D" to cause the brake pads to contact the rotor 104. In the actuated position, when the floating portion 108 moves towards the rotor 104, the outside nut 135 around the caliper pin 110 forces the magnet carrier 228, and therefore the magnet 216, to move in accordance with the movement of the floating portion 108.

It should be noted that while the example embodiments show one effective way to attach the magnet 216 to the floating portion 108, the subject technology can also be practiced when the magnet 216 and floating portion 108 are coupled in other ways so long as the position of the magnet 216 changes when the brake system 100 actuates (e.g., the floating portion 108 moves). In the particular embodiment shown, the magnet 216 moves along magnet axis "a", parallel to the movement of the floating portion 108 and parallel to the length of the respective housing 230.

As the brake pads wear down, applying the brakes will cause the floating portion 108 to move closer to the rotor 104 (since the width of the brake pads between the rotor 104 and floating portion 108 will be diminished), resulting in a larger displacement distance "D" of the floating portion 108 as the brakes are applied. As the brakes wear down, this in turn results in a change in the position of the magnet 216 with respect to the sense element 226 when the brakes are applied. The sensor assembly 212 is configured to generate a signal having a strength that is based on, for example, the strength and/or angle of the magnetic field sensed by the sense element 226, which is changed depending on the relative positions of the magnet 216 and sense element 226. The signal strength, therefore, will be correlative with the relative position of between the magnet 216 and the sense element 226. The strength of this signal can then be relied upon to determine the relative position of the brake pads when the brakes are applied versus when they are not applied, which is indicative of brake pad wear.

The positional data is processed by the electronics module assembly 224, which can include an ASIC, microprocessor, or the like, to convert data received from the sense element 226 regarding the distance (or displacement) to the respective magnet 216 into a value representing brake pad wear. The electronics module assembly 224 may also only partially process the positional data with most of the processing being performed remotely.

The brake pad wear value given can represent the width of the brake pad between the caliper assembly 102 and the rotor 104. A wireless transmitter can then transmit the signal which is representative of the distance "D" (and/or the value of brake pad wear) to detached electronics within the vehicle. For example, the signal could be wirelessly transmitted to a display within the interior of the vehicle so that a user can track brake pad wear continuously, such as every time the brakes are applied or periodically at defined time-based intervals (e.g. every five minutes). By displaying a value of brake pad wear as the brake pads wear down, the user can easily predict when the brake pads might need to be replaced. This information can also provide an accurate assessment and prediction of brake pad health over the life of the brake pads. Further, the amount of brake pad wear caused by a specific driver, trip, or the like, can be found by viewing brake pad wear values before and after the vehicle is used. A maintenance technician may also utilize the positional data/indication of brake wear via a maintenance device to assess recommended and required maintenance activity like changing the brake pads.

In other applications, the brake pad data generated by the sensor assembly 212 can be relied upon for safety measures, such as detecting improper caliper function/operation, advanced insight of driver behavior, or possible brake failure. For example, the sensor assembly 212 on each caliper assembly 102 will generate a first sensor reading when the brakes are not in use. Each sensor assembly 212 on each caliper assembly 102 will also generate a second sensor reading when the brakes are in use, the differences between the first and second sensor readings can then be relied upon to calculate the amount which the floating portion 108 moved when the brake was activated, and ultimately, the brake pad wear. However, if there is a significant deviation between the signal difference determined for one wheel as compared to another, this could potentially alert the driver to a problem with caliper assembly 102 or a failure of the braking system 100. Likewise, ranges of likely second sensor readings can be generated based on the known distance between the floating portion 108 of the caliper assembly 102 and the rotor 104, current brake pad wear, and expected brake pad compression given the brake pad pressure load or degree to which the brakes were applied (e.g. the brake pads will be expected to compress to different degrees if the user lightly taps the brakes versus if they slam on the brakes for an emergency stop). Notably, this example will also require some input regarding the degree to which the brakes were applied during one or more braking events. The second sensor reading can then be compared to an expected second sensor reading and if there is a significant deviation. Whether a particular deviation is significant can be determined on a case by case basis or based on compiled data for past known deviations from that particular vehicle or from a number of vehicles.

Data tracked and reported by the sensor assembly 212 can also be relied on for diagnostic information such as brake pad activation and caliper motion during braking events. This data can be used, for example, to detect potential problems with the braking system 100, report the performance of a particular braking system 100 or parts thereof, or track brake usage of a given user or vehicle.

It should be noted that while the example above is given for explanatory purposes, in different embodiments the components associated with the first portion 201 and the second portion 203 could be reversed. For example, the sensor assembly 212 could be part of the second portion 203 and could move in response to movement of the floating portion 108. Meanwhile, the magnet 216 could be part of the first portion 201 and could be immovably attached to the fixed mount bracket 106. The overall assembly would still function similarly to the examples given in FIGS. 2-4 as the sense element 226 would still identify a distance to the respective magnets 216 (i.e. a magnetic field perceived by the sense element 226) which could be used to determine brake pad wear.

Referring now to FIGS. 5A and 5B, the various components of the sensor assembly 212 are shown. The sensor assembly 212 includes a housing 230 and cover 232 which can be attached to one another to form a chamber 234 to protect the electronics module assembly 224. The housing 230, cover 232, and electronics module assembly 224 all include axially aligned bore holes 236. Threaded fasteners 238 are inserted through the bore holes 236 to hold the cover 232, housing 230, and electronics module assembly 224 firmly together. The housing 230 and cover 232 can be made of a material such as plastic, aluminum, or the like, that is rigid and durable enough to protect the electronics module assembly 224 while also not interfering with any of the components on the electronics module assembly 224 such as the sense element 226. An epoxy potting 243 can be dispensed between the cover 232 and electronics module assembly 224 to help protect the components the components on the electronic module assembly 224 (however the epoxy potting 243 need not be included).

The electronics module assembly 224 includes printed circuit boards with various components related to sensing and signal processing and transmission (not all of which are distinctly shown/described). The electronics module assembly 224 derives power from an internal battery 240 and also includes antennas for wireless signal transmission. The entire sensor assembly 212 can bolted to the caliper assembly 102 of a typical brake system 100, as shown in FIGS. 2-4 by fastening the flange 242 of the housing 230 to the caliper assembly 102.

The magnet 216 of the sensing assembly 212 attaches to a separate portion of the caliper assembly 102 via the magnet carrier 228. In one embodiment, the magnet 216 can be rectangular and movement along the magnet axis "a" can be parallel to a sidewall 217 of the housing 230. However, the magnet 216 need not be any specific shape and can move in any direction with respect to the sensing assembly 212 (e.g. perpendicular or a direction neither perpendicular or parallel) as long as the relative positions of the sensing assembly 212 and magnet 216 are changed by the movement. The magnet 216 is formed from a material ideally suited to influence the sense element 226 such as an Alnico alloy. The magnet 216 is held within the magnet carrier 228 perpendicular to a mounting flange 244. The magnet carrier 228 is secured in place by the caliper bolts 110 passing through the mounting flange 244. As a result, the magnet 216 is coupled to the caliper assembly 102 in a way that allows movement of the magnet 216 in response to movement of the floating portions 108 in a substantially parallel direction (i.e. parallel to axis "a").

In some embodiments, the electronics module assembly 224 can also include a temperature sensor (not distinctly shown). The temperature sensor can be incorporated within the sense element 226, or can be placed at some other location on the electronics module assembly. The temperature sensor can help track information related brake pad temperature when the brakes are applied. Data related to brake pad temperature can then be provided to the user, for example via a display in the vehicle, so the driver can be alerted to an overheated condition. Similarly, brake pad temperature information can be tracked and stored and/or sent to an output to track brake pad usage by a particular driver or brake performance.

Referring now to FIGS. 6A-6E, various views of another brake assembly 100 and a sensor assembly 312 are shown. This brake assembly and sensor assembly 312 are very similar to the embodiments discussed above so that like components have the same reference numbers or similar reference numbers in the "300" series instead of the "200" series whenever possible. The following description is directed to the differences between the sensor assemblies 212, 312. The primary difference is that the magnet 316 can be cylindrical to allow for movement along the magnet axis "a" within a cylindrical channel 314 of the housing 330. The cylindrical shape allows for easier manufacturing and assembly. Further, movement along the magnet axis "a" of the cylindrically shaped magnet 316 through the cylindrically shaped channel 314 optimizes the perceived change in magnetic field of the sensor assembly 312 across the stroke of the brake system 100. Additionally, this results in improved accuracy and also helps to shield the magnet 316 from the effects of the harsh environment surrounding the brake system 100.

Figure 7A:
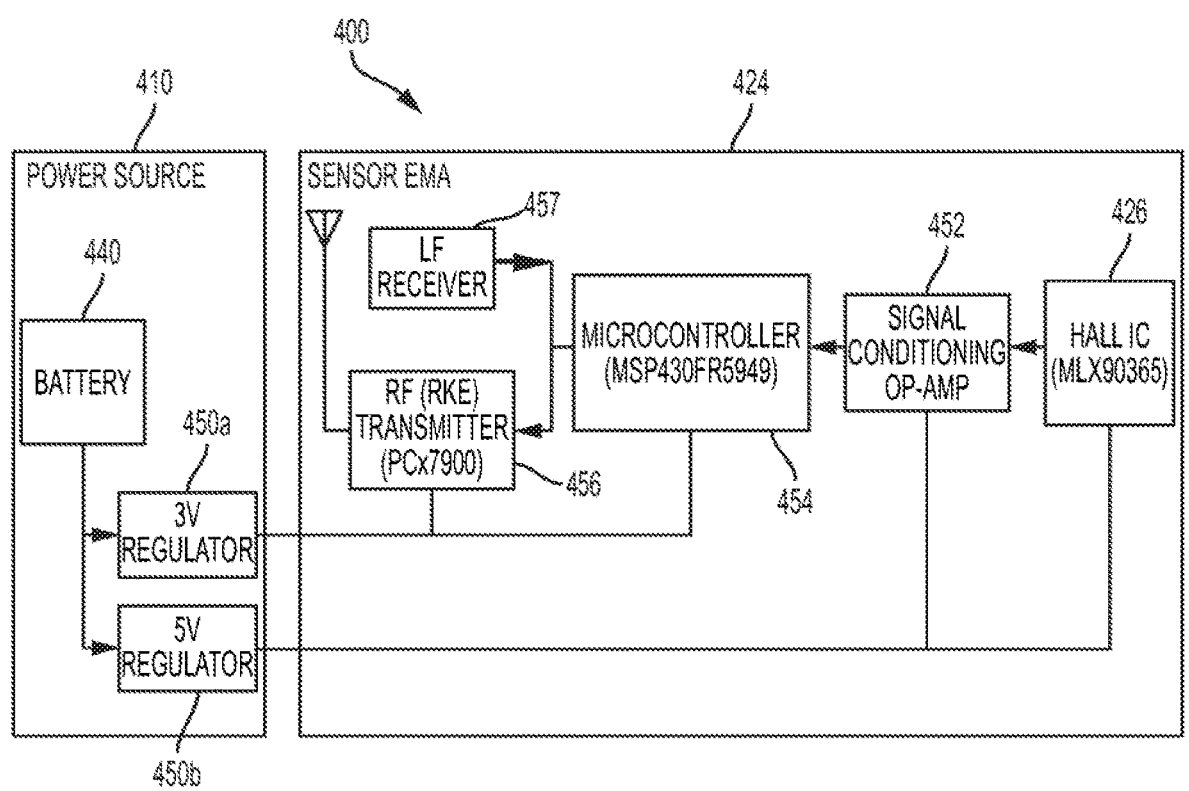
FIG. 7A is a simplified block diagram representing the electrical configuration of an electronics module assembly and battery in accordance with the subject technology.

Referring now to FIG. 7A, a block diagram 400 of one example of the circuitry of an electronics module assembly 424 and a corresponding power source 410. In this case, the power source 410 provides power from a battery 440 that is internal to the vehicle and external to the electronics module assembly 424. However, in other embodiments, an internal battery is included as a part of the electronics module assembly 424 to power the vehicle. The power source 410 includes a battery 440 coupled to a 3V regulator 450a and a 5V regulator 450b to supply power to the various components of the electronics module assembly 424. Power from the battery 440 passes through a particular voltage regulator 450a, 450b depending on the requirements of each particular component. In the example shown, power passes through a 5V regulator 450b to power the sense element 426 and a signal conditioning operational amplifier 452. Power passes through a 3V regulator to power a microcontroller 454 and RF transmitter 456.

The sensor element 426 detects the position of the respective magnet 216, 316 for generating a signal representing the position of that magnet 216, 316 with respect to itself. If the system is configured properly, this signal with bear a relationship to the overall wear of the brake pads of a vehicle. The signal is then sent through an operational amplifier 452 which then provides the signal to the microcontroller 454. The microcontroller 454 further processes the signal. The signal can then be provided to the RF transmitter 456 for wireless transmission to a vehicle display or other device. An LF receiver 457 also provides a one way communication channel back to the microcontroller 454, as well as other components within the electronics module assembly 424. The LF receiver 457 provides a means to initialize, test, and calibrate the electronics module assembly 424 as well as any corresponding sensor assembly. Preferably, the LF receiver 457 can be set into various modes of operation wirelessly to allow such initialization, testing and calibration.

Figure 7B:
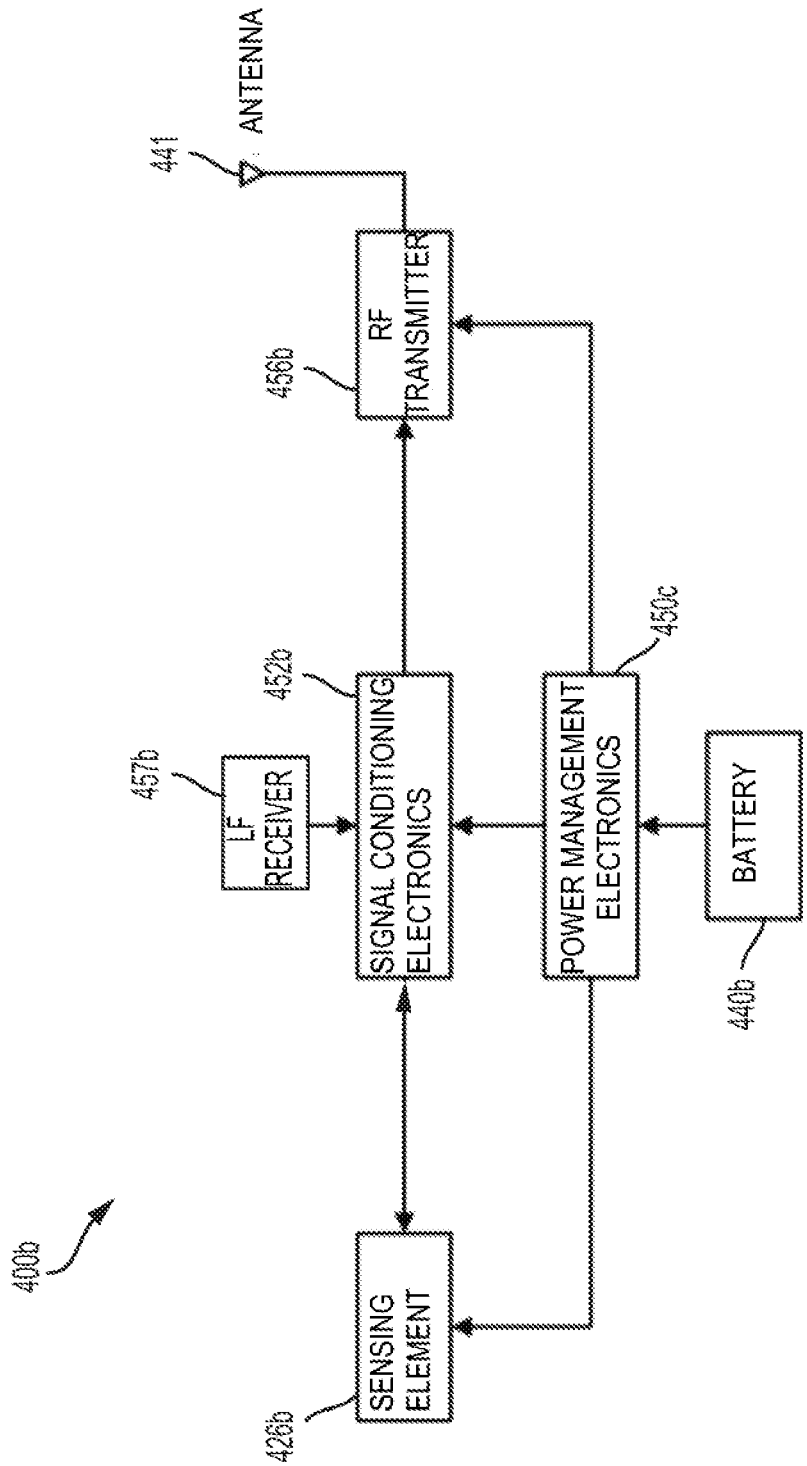
FIG. 7B is another simplified block diagram representing the electrical configuration of an electronics module assembly in accordance with the subject technology.

Referring now to FIG. 7B, a block diagram 400b of another example of the circuitry of an electronics module assembly 424 is shown. In this example, the electronics module assembly includes an internal battery 440b which powers some, or all of the other components shown on the block diagram 400b. The sense element 426b generates a signal, as discussed above, and provides that signal to signal conditioning electronics 452b. The signal conditioning electronics 452b can include various electronics to process, transmit, modify, or store signals generated by the sense element 426b. For example, the signal conditioning electronics 452b can include operation amplifiers, microcontrollers, or application specific integrated circuits programmed to take particular actions when signals falling within a certain range are received. The signal conditioning electronics 452b then provide the signal to the RF transmitter 456 for wireless transmission, via the antenna 441, to a vehicle display or other device. Similar to the LF receiver 457b described above, the LF receiver 457b also for initializing, testing, and calibration of the components within the electronics module assembly 424 and any corresponding sensor assembly. Notably, while not to distinctly shown, the electronics module assembly 424 may also include a temperature sensor. The temperature sensor can be a part of sense element 426b, or can similarly interface with the internal battery 440b and signal conditioning electronics 452b.

Referring now to FIGS. 8-10D, another embodiment of a position sensing system on a braking system is shown. The position sensing system has many similar components to the other systems described herein, and all components can be assumed to be the same unless otherwise shown or described. In general, while the other embodiments shown herein utilize magnetic position sensors and magnets, the embodiment shown uses an inductive position sensor assembly 512 and a metallic reference portion 560. Particularly, the sensor assembly 512 is configured to generate a signal having a strength correlative to a displacement distance between the metallic reference portion 560 and the sensor assembly 512 (or a portion of the sensor assembly 512, such as a sense element 526).

Similar to other embodiments described herein, the sensor assembly 512 includes a cover 532 and housing 530 which are coupled together to form a chamber 534 which contains an electronics module assembly 524. The electronics module assembly 524 has an inductive sense element 526 in the form of an arrangement of transmitting and receiving inductive coils which detect the distance to the position of a corresponding metallic reference portion 560. In the example shown, this metallic reference portion 560 is an integrated part of the floating portion 108 of the caliper assembly 102. Alternatively, or additionally, the metallic reference portion 560 can be a separate metallic protrusion attached to the floating portion 108 which can easily be detected by the inductive sense element 526. In general, the front face 562 of the cover 532 sits in close proximity to the metallic reference portion 560 (i.e. about 2 mm away).

Figure 8:
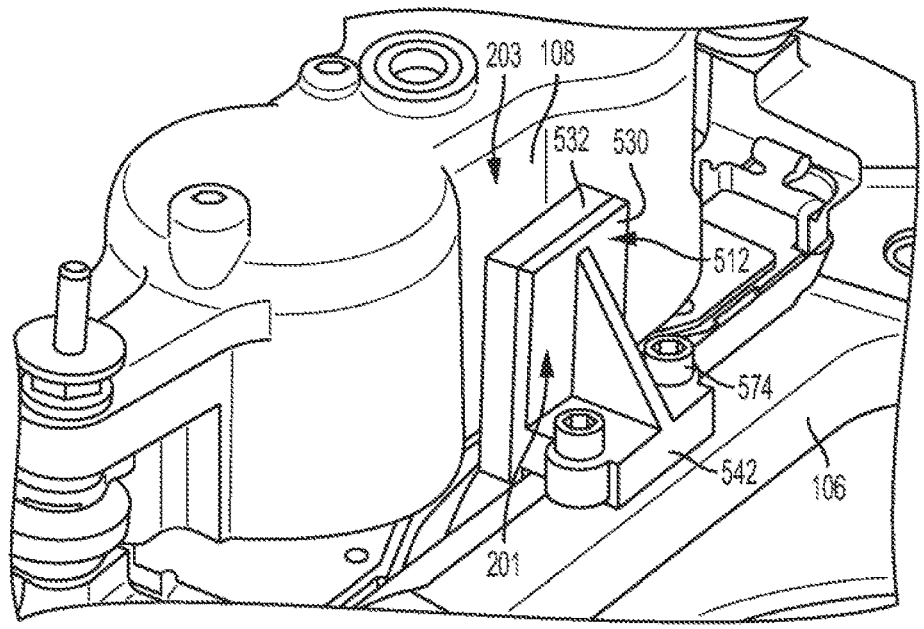
FIG. 8 is a perspective view of a braking system including an embodiment of a position sensing system in accordance with the subject technology.
Figure 9:
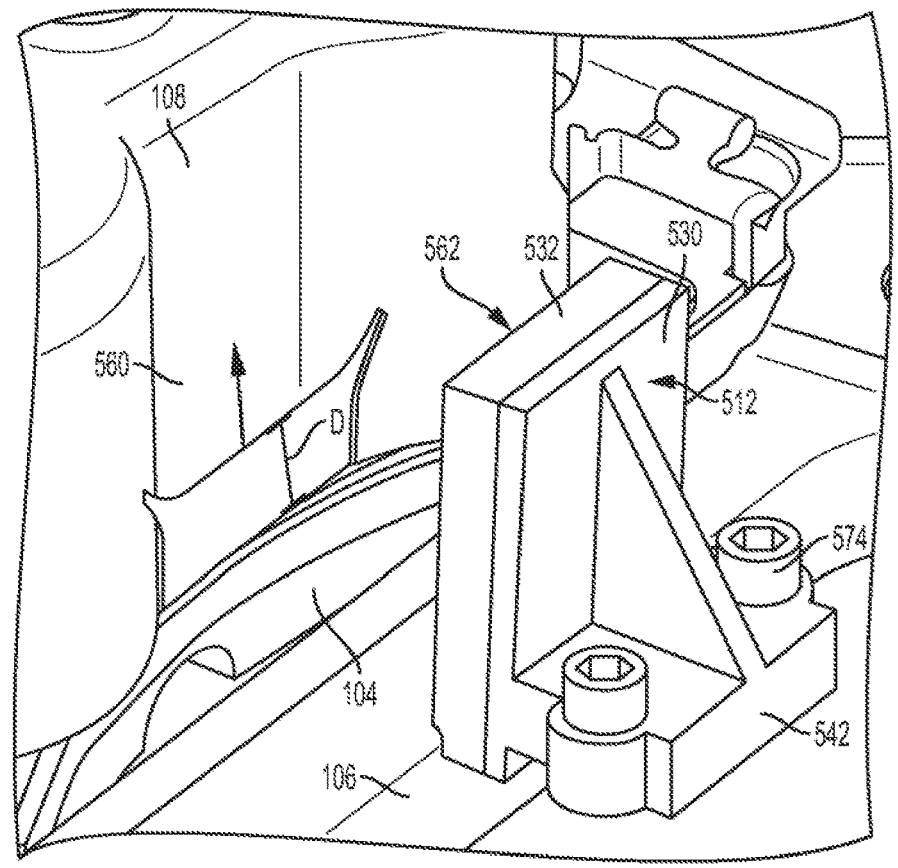
FIG. 9 is a perspective view of a braking system including an embodiment of a position sensing system in accordance with the subject technology.

When the brakes are not being applied, the metallic reference portion 560 is in a first, default position, as seen in FIG. 9. Once the brakes are applied, the floating portion 108 moves from the first default position into a second, active position as the floating portion 108 clinches the brake pads against the rotor 104, as shown in FIG. 8. This distance is represented by the displacement line "D", showing the travel of the floating portion 108 (and corresponding metallic reference portion 560) between when the brakes are and are not applied. Notably, in FIG. 9, the sensor assembly 512 has been moved back from the caliper assembly 102 to better illustrate the displacement distance "D", however it should be understood the sensor assembly 512 is still fixed to the caliper assembly 102 as shown in FIG. 8. In this example, the inductive sense element 526 is particularly configured on the electronics module assembly 524 such that the electronics module assembly 524 is positioned along a plane parallel to the direction of the displacement "D" of the floating caliper assembly 102. As the brake pads wear, the displacement "D" of the brakes will increase proportionally to the degree to which the brake pads have worn. Therefore by ensuring the displacement "D" corresponds to movement of the metallic reference portion 560, the sensor assembly 512 can be configured to determine the degree to which the brake pads have worn. Notably, while having a metallic reference portion 560 which travels parallel to front face 562 of the sensor assembly 512 has been found to be advantageous, in other embodiments the metallic reference portion 560 need only travel in a direction such that the relative position of the metallic reference portion 560 and sensor assembly 512 changes when the brakes are activated.

The electronics module 524 of this embodiment also includes various components for processing, transmitting, and analyzing signals from the inductive sense element 526. For example, the electronics module assembly 524 can include a printed circuit board, inductive sense element 526 (and corresponding transmitting and receiving inductive coils), an RF antenna, a wireless transmitter, and other passive electronic components. The electronics module assembly 524 also includes an internal battery 540 which is also housed within the chamber 534 formed between the housing 530 and the cover 532. The battery 540 provides power to the electronics module assembly 524, eliminating the need to connect the electronics module assembly 524 to any power supply within the vehicle.

The housing 530 includes a flange 542 which allows for easy attachment of the sensor assembly 512 to the fixed mount bracket 106. For example, the flange 542 can include axial bores 572 with threaded interiors. Screws 574 can be threaded through the axially bores 572 directly into the fixed mount bracket 106 to hold the sensor assembly 512 firmly in place. Similarly, the screws 574 can be easily removed to detach the sensor assembly 512, for example, when changing calipers 102, servicing the sensor assembly 512, or otherwise as needed. The two bore holes 572 shown are positioned on opposite sides of the flange 542 for improved stability of the sensing assembly 512 when the sensor assembly 512 is fixed to the caliper assembly 102. Notably, in some embodiments, the housing 530 and/or cover 532 need not be solid plastic members, but instead, can be formed from soft epoxy layers. The soft epoxy layers can allow for improved wireless signal transmission to and/or from the sensor assembly 512, while still protecting the electronics module assembly 524 from the harsh environment surrounding the braking system.

It will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements (e.g., electronics, sense elements, transmitters, and the like) shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

What is claimed is:

1. A braking system comprising:
a rotor;
a caliper assembly disposed at least partially around the rotor for exerting a stopping force against the rotor, the caliper assembly having a fixed mount bracket and a floating portion;
a sensor assembly having: a sense element removably coupled to the fixed mount bracket for generating a signal indicating a position of the floating portion, wherein the sense element senses a magnetic field and generates the signal; a wireless transmitter for sending the signal from the sensor assembly to detached electronics; a magnet removably coupled to the floating portion for movement therewith; a housing; and a cover attached to the housing to form a chamber containing an electronics module assembly, the electronics module assembly including the sense element; and
wherein the housing forms a channel around an axis, the magnet is positioned to move along the axis in response to movement of the floating portion; and the magnet generates the magnetic field, and
wherein the signal is indicative of a value of actual brake pad wear.

2. The braking system of claim 1 further comprising a microprocessor configured to receive the signal and calculate the value of actual brake pad wear based on the signal, wherein the caliper assembly includes at least one brake pad attached to the floating portion.

3. The braking system of claim 2 further comprising a display coupled to the detached electronics for showing the value of actual brake pad wear.

4. The braking system of claim 1 wherein the magnet and the channel are cylindrical in shape.

5. The braking system of claim 1 wherein the electronics module assembly has: a printed circuit board; an antenna; a battery; and the wireless signal transmitter.

6. The braking system of claim 2 wherein the microprocessor is configured to:
store data related to values of expected brake pad wear;
compare the values of expected brake pad wear to the values of actual brake pad wear; and
alert a user of deviations between the value of actual brake pad wear and the value of expected brake pad wear.

7. The braking system of claim 1 further comprising a microprocessor configured to:
receive a value of brake pressure load representing the degree to which the brakes have been activated by a user;
calculate an expected signal strength based at least in part on the value of brake pressure load; and
alert a user of deviations between the signal strength and the expected signal strength.

8. The braking system of claim 2 wherein the microprocessor is configured to:
compare the value of actual brake pad wear with a second value of brake pad wear, the second value of brake pad wear representing the wear of a brake pad corresponding to a separate caliper assembly;
alert a user of deviations between the value of actual brake pad wear and the second value of brake pad wear.

9. A position sensing system for a braking assembly, the braking assembly including: a rotor; a caliper assembly disposed at least partially around the rotor and having a fixed mount bracket and a floating portion; and at least one brake pad attached to the floating portion operable to exert a first force against the rotor in response to a second force through the floating portion, the position sensing system comprising:
a magnet for generating a magnetic field, the magnet removably coupled to a caliper slide pin via a carrier for movement with the floating portion; and
a sensor assembly including: a housing with a flange configured to removably attach the sensor assembly to the fixed mount bracket; an electronics module assembly including a sense element that senses the magnetic field to generate a signal having a strength correlative to the relative positions of the magnet and the sensor assembly; and a wireless transmitter for sending the signal from the sensor assembly to detached electronics,
wherein:
the sensor assembly includes a cover attached to the housing to form a chamber containing the electronics module assembly;
the housing forms a channel around an axis, and the magnet is positioned to move along the axis in response to movement of the floating portion; and
the signal is indicative of a value of actual brake pad wear.

10. The position sensing system of claim 9 wherein the electronics module assembly has: a printed circuit board; an antenna; a battery; and the wireless signal transmitter.

11. A position sensing system for a braking assembly, the braking assembly including: a rotor; a caliper assembly disposed at least partially around the rotor having a fixed mount bracket and a floating portion; and at least one brake pad attached to the floating portion operable to exert a first force against the rotor in response to a second force through the floating portion, the position sensing system comprising:
a metallic reference portion coupled to the floating portion such that movement of the floating portion causes a corresponding movement in the metallic reference portion; and
an inductive sensing assembly removably attached to the fixed mount bracket by a housing, the inductive sensing assembly having: an inductive sense element configured to generate a signal having a strength correlative to a displacement distance between the sensor assembly and the metallic reference portion;
a cover is attached to the housing to form a chamber containing an electronics module assembly, and the cover and the electronics module assembly are arranged parallel to a plane, wherein movement of the floating portion causes the metallic reference portion to move parallel to the plane; and
a wireless transmitter for sending the signal from the sensor assembly to detached electronics,
wherein the signal is indicative of a value of actual brake pad wear.

12. The position sensing system of claim 11 wherein the inductive sensing assembly includes the electronics module assembly having: the inductive sense element; a printed circuit board; an antenna; a battery; and the wireless transmitter.

13. The position sensing system of claim 12 wherein the housing includes a flange with a threaded axial bore for receiving a screw to removably attach the housing to the fixed mount bracket.

* * * * *